(12) United States Patent
Han et al.

(10) Patent No.: US 10,351,924 B2
(45) Date of Patent: Jul. 16, 2019

(54) HOT-DIP GALVANIZED STEEL SHEET AND HOT-DIP GALVANNEALED STEEL SHEET HAVING IMPROVED HOLE EXPANSION RATIO, AND MANUFACTURING METHODS THEREOF

(71) Applicant: POSCO, Pohang-si, Gyeongsangbuk-do (KR)

(72) Inventors: Sang-Ho Han, Gwangyang-si (KR); Seong-Ho Han, Gwangyang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 318 days.

(21) Appl. No.: 14/888,394

(22) PCT Filed: May 8, 2015

(86) PCT No.: PCT/KR2015/004592
§ 371 (c)(1),
(2) Date: Oct. 30, 2015

(87) PCT Pub. No.: WO2016/098963
PCT Pub. Date: Jun. 23, 2016

(65) Prior Publication Data
US 2016/0340755 A1 Nov. 24, 2016

(30) Foreign Application Priority Data

Dec. 19, 2014 (KR) .................. 10-2014-0184936
May 7, 2015 (KR) .................. 10-2015-0064056

(51) Int. Cl.
| | |
|---|---|
| *C21D 9/46* | (2006.01) |
| *C23C 2/02* | (2006.01) |
| *C22C 38/38* | (2006.01) |
| *C21D 8/02* | (2006.01) |
| *C23C 2/06* | (2006.01) |
| *C22C 38/22* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/32* | (2006.01) |
| *C23C 2/28* | (2006.01) |
| *C21D 9/56* | (2006.01) |

(Continued)

(52) U.S. Cl.
CPC .............. *C21D 9/46* (2013.01); *B32B 15/01* (2013.01); *B32B 15/013* (2013.01); *C21D 8/0221* (2013.01); *C21D 8/0226* (2013.01); *C21D 8/0236* (2013.01); *C21D 8/0247* (2013.01); *C21D 8/0263* (2013.01); *C21D 8/0278* (2013.01); *C21D 9/561* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/32* (2013.01); *C22C 38/38* (2013.01); *C23C 2/02* (2013.01); *C23C 2/06* (2013.01); *C23C 2/28* (2013.01); *C23C 2/285* (2013.01); *C21D 1/74* (2013.01); *C21D 2211/002* (2013.01); *C21D 2211/005* (2013.01); *C21D 2211/008* (2013.01); *C21D 2251/02* (2013.01)

(58) Field of Classification Search
CPC .............. C21D 1/74; C21D 2211/002; C21D 2211/005; C21D 2211/008; C21D 2251/02; C21D 8/0221; C21D 8/0226; C21D 8/0236; C21D 8/0247; C21D 8/0263; C21D 8/0278; C21D 9/46; C21D 9/561; C22C 38/001; C22C 38/002; C22C 38/02; C22C 38/04; C22C 38/06; C22C 38/22; C22C 38/32; C22C 38/38; C23C 2/02; C23C 2/06; C23C 2/285

See application file for complete search history.

(56) References Cited

U.S. PATENT DOCUMENTS

| | | | |
|---|---|---|---|
| 2003/0129444 A1 | 7/2003 | Matsuoka et al. | |
| 2004/0054018 A1* | 3/2004 | Mukhopadhyay | ....... C08J 11/06 521/40 |

(Continued)

FOREIGN PATENT DOCUMENTS

| | | |
|---|---|---|
| CN | 1717499 A | 1/2006 |
| CN | 1732279 A | 2/2006 |

(Continued)

OTHER PUBLICATIONS

Chinese Office Action for Chinese Application No. 201580011403.9, dated May 16, 2017.

(Continued)

*Primary Examiner* — Jenny R Wu
(74) *Attorney, Agent, or Firm* — Morgan Lewis & Bockius LLP

(57) ABSTRACT

A hot-dip galvanized steel sheet includes a base steel sheet and a hot-dip galvanized layer formed on the base steel sheet, the base steel sheet including, by wt %, C:0.02% to 0.08%, Mn:1.3% to 2.1%, Si:0.3% or less (excluding 0%), Cr:1.0% or less (excluding 0%), P:0.1% or less (excluding 0%), S: 0.01% or less (excluding 0%), N:0.01% or less (excluding 0%), sol.Al: 0.02% to 0.06%, Mo:0.2% or less (excluding 0%), B:0.003% or less (excluding 0%), and a balance of Fe and inevitable impurities, wherein the base steel sheet has a microstructure comprising 90% or more by area of ferrite, 3% or less by area of bainite as described in Formula 1, and martensite as a remainder.

11 Claims, 4 Drawing Sheets

(51) Int. Cl.
B32B 15/01 (2006.01)
C21D 1/74 (2006.01)

(56) References Cited

U.S. PATENT DOCUMENTS

| | | | |
|---|---|---|---|
| 2004/0131494 A1* | 7/2004 | Inoue | B21K 1/766 |
| | | | 420/88 |
| 2004/0202889 A1 | 10/2004 | Fujita et al. | |
| 2006/0081312 A1 | 4/2006 | Yokoi et al. | |
| 2006/0222882 A1 | 10/2006 | Honda et al. | |
| 2009/0032150 A1* | 2/2009 | Ohe | C21D 8/105 |
| | | | 148/593 |
| 2010/0132850 A1 | 6/2010 | Ono et al. | |
| 2012/0037281 A1 | 2/2012 | Ono et al. | |
| 2013/0071687 A1 | 3/2013 | Takagi et al. | |
| 2014/0044989 A1 | 2/2014 | Toda et al. | |
| 2014/0193667 A1 | 7/2014 | Shuto et al. | |
| 2014/0212684 A1 | 7/2014 | Kawata et al. | |
| 2014/0230971 A1 | 8/2014 | Kawasaki et al. | |
| 2014/0377582 A1 | 12/2014 | Azuma et al. | |
| 2015/0225829 A1 | 8/2015 | Fujita et al. | |
| 2015/0275345 A1 | 10/2015 | Fujita et al. | |

FOREIGN PATENT DOCUMENTS

| | | |
|---|---|---|
| CN | 101125472 A | 2/2008 |
| CN | 101326299 A | 12/2008 |
| CN | 102918174 A | 2/2013 |
| CN | 103492599 A | 1/2014 |
| CN | 103732775 A | 4/2014 |
| CN | 103797145 A | 5/2014 |
| CN | 104105807 A | 10/2014 |
| EP | 2447390 A1 | 5/2012 |
| EP | 2738280 A1 | 6/2014 |
| JP | 2004-292891 A | 10/2004 |
| JP | 2005-264176 A | 9/2005 |
| JP | 2007-070649 A | 3/2007 |
| JP | 2009-035814 A | 2/2009 |
| JP | 2011-111675 A | 6/2011 |
| JP | 2013-163827 A | 8/2013 |
| JP | 2013-185240 A | 9/2013 |
| KR | 960003730 B1 * | 3/1996 |
| KR | 10-2002-0073564 | 9/2002 |
| KR | 10-2014-0027526 A | 3/2014 |
| WO | 2007/067014 A1 | 6/2007 |
| WO | 2010/087529 A1 | 8/2010 |
| WO | 2011/152017 A1 | 12/2011 |
| WO | 2013/018739 A1 | 2/2013 |
| WO | 2014/021452 A1 | 2/2014 |
| WO | 2014073520 A1 | 5/2014 |

OTHER PUBLICATIONS

Japanese Office Action issued in Japanese Application No. JP 2016-547851, dated Jul. 11, 2017.
Extended European Search issued in corresponding European Application No. 15870131.8, dated Oct. 2, 2017.
European Office Action dated Aug. 7, 2018 issued in European Patent Application No. 15870131.8.
E. Hryha, et al., "On-line control of processing atmospheres for proper sintering of oxidation-sensitive PMS steels," Journal of Materials Processing Technology, 2012, vol. 212, No. 4, pp. 977-987.

* cited by examiner

[Figure 1]
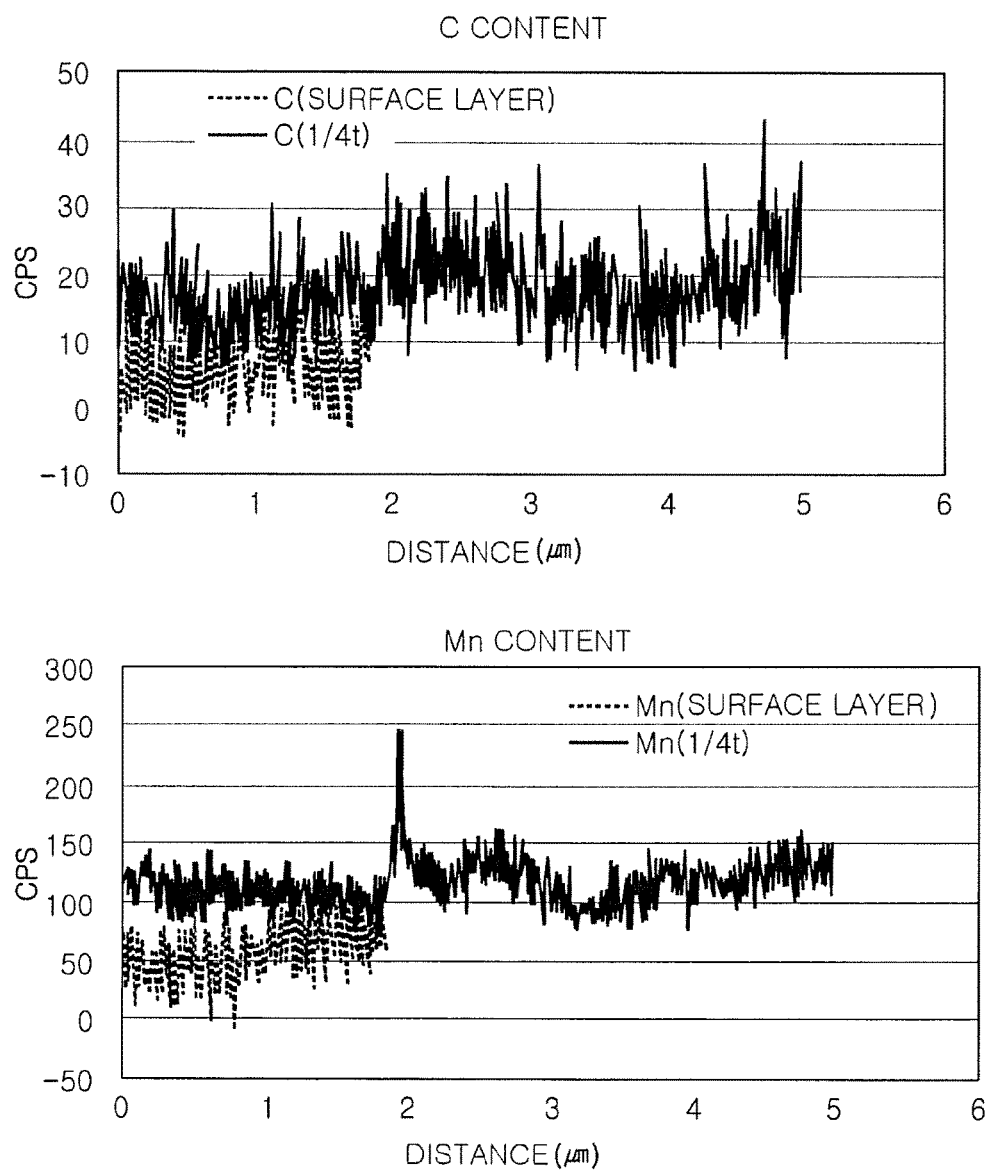

[Figure 2]
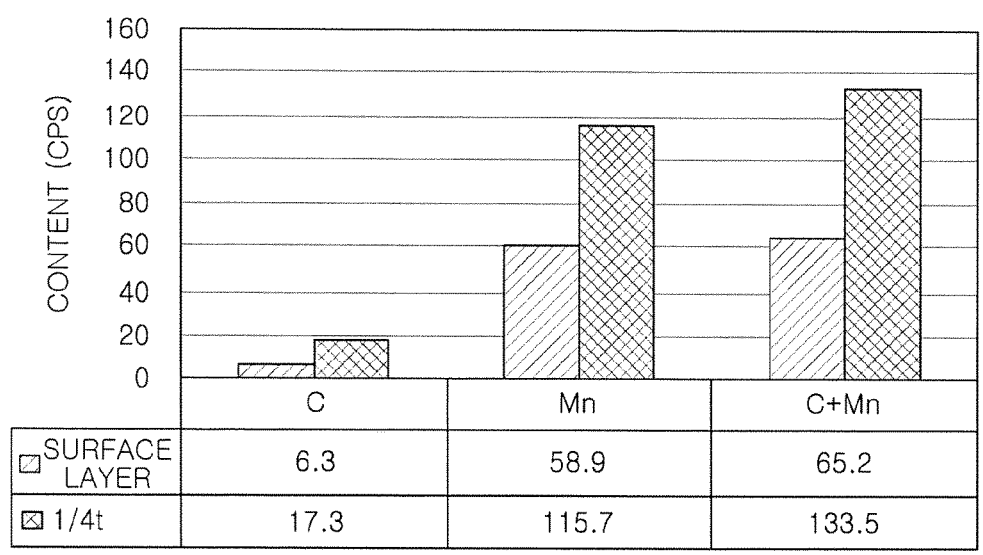

【Figure 3】
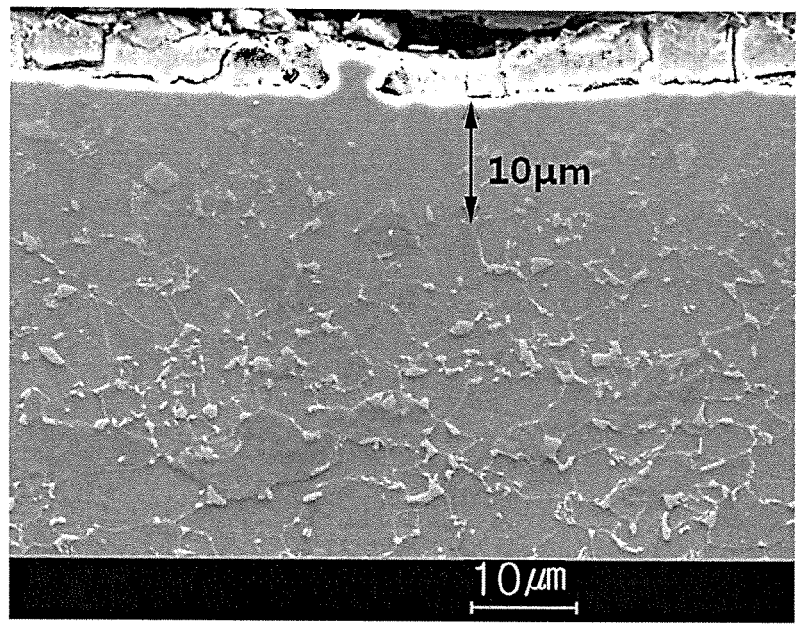

[Figure 4]
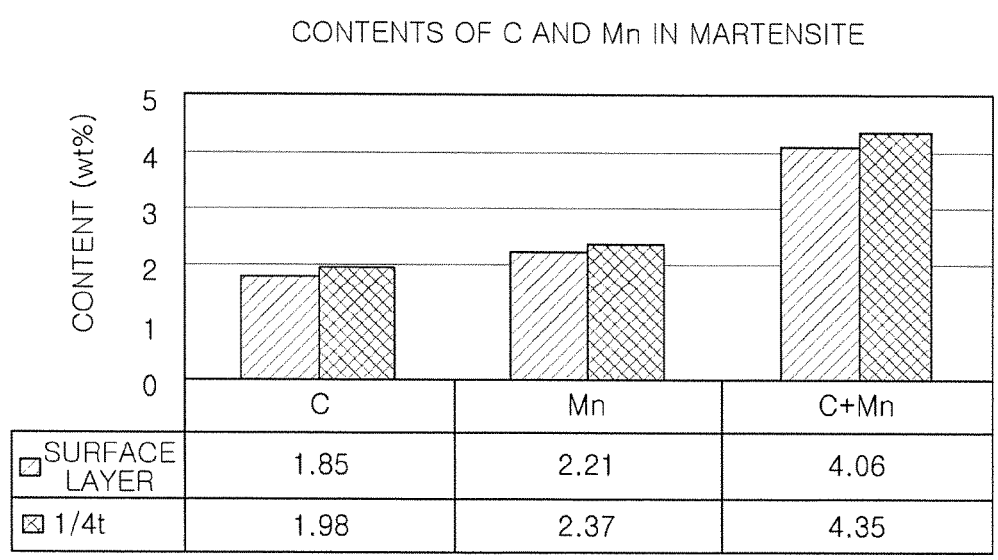

HOT-DIP GALVANIZED STEEL SHEET AND HOT-DIP GALVANNEALED STEEL SHEET HAVING IMPROVED HOLE EXPANSION RATIO, AND MANUFACTURING METHODS THEREOF

RELATED APPLICATIONS

This application is the U.S. National Phase under 35 U.S.C. § 371 of International Patent Application No. PCT/KR2015/004592, filed on May 8, 2015, which in turn claims the benefit of Korean Application No. 10-2015-0064056, filed on May 7, 2015 and Korean Application No. 10-2014-0184936, filed on Dec. 19, 2014, the disclosures of which are incorporated by reference herein.

TECHNICAL FIELD

The present disclosure relates to a method of manufacturing a hot-dip galvanized steel sheet having an improved hole expansion ratio (HER), and more particularly, to a hot-dip galvanized steel sheet and a hot-dip galvannealed steel sheet having an improved HER and suitable for manufacturing parts such as automotive outer panels, and manufacturing methods thereof.

BACKGROUND ART

Along with the trend of emphasizing the crashworthiness and fuel efficiency of automobiles, the use of high tensile steel for manufacturing automotive chassis has increased to satisfy the demand for lightweight, high-strength automobiles. In addition, the use of high-strength steel for manufacturing automotive outer panels has also increased. At present, 340-MPa grade bake hardening steel sheets are used for manufacturing most automotive outer panels, and 490-MPa grade steel sheets are used for manufacturing some automotive outer panels. Also, the use of 590-MPa grade steel sheets is also expected.

Such high-strength steel sheets used for manufacturing automotive outer panels have lightweight and dent-resistant features but have poor formability due to the high-strength features thereof. In addition, if high-strength steel sheets having a low hole expansion ratio (HER) are used, cracks may be formed in edge regions of machined portions of the high-strength steel sheets. Therefore, automobile manufacturers have recently required high-strength steel sheets having an improved HER for automotive outer panels to compensate for poor workability of the high-strength steel sheets by the high HER. In addition, steel sheets for automotive outer panels should have a high degree of surface quality. However, since oxidizable hardening elements such as silicon (Si) and manganese (Mn) are included in such steel sheets to increase the strength of the steel sheets, it is difficult to obtain a high degree of surface quality after plating the steel sheets.

Moreover, steel sheets for automobiles should have a high degree of corrosion resistance. Thus, hot-dip galvanized steel sheets having a high degree of corrosion resistance have long been used for manufacturing automobiles. Since hot-dip galvanized steel sheets are produced using continuous hot-dip galvanizing equipment in which a recrystallization annealing process and a galvanizing process are performed in the same production line, the hot-dip galvanized steel sheets having a high degree of corrosion resistance may be manufactured with low costs. In addition, hot-dip galvannealed steel sheets obtained by heat-treating hot-dip galvanized steel sheets have a high degree of corrosion resistance in addition to a high degree of weldability or formability, and thus they are widely used.

As described above, the development of high tensile cold-rolled steel sheets having a high degree of formability has been required to manufacture automotive outer panels having lightweight and workable features, and along with this, the development of high tensile hot-dip galvanized steel sheets having high degrees of corrosion resistance, weldability, and formability has also been required.

A technique for improving the workability of high tensile steel sheets is disclosed in Patent Document 1 (Japanese Patent Application Laid-open Publication NO.: 2005-264176). Patent Document 1 discloses a multi-phase steel sheet having martensite as a main phase, and a method of manufacturing a high tensile steel sheet by dispersing fine copper (Cu) precipitates having a particle diameter of 1 nm to 100 nm in the microstructure of the steel sheet to improve the workability of the steel sheet. According to the technique disclosed in Patent Document 1, copper (Cu) has to be added in a large amount of 2% to 5% in order to precipitate fine copper (Cu) particles. However, copper (Cu) may cause red brittleness and incurs high manufacturing costs.

Patent Document 2 (Japanese Patent Application Laid-open Publication No.: 2004-292891) discloses a multi-phase steel sheet including ferrite as a main phase, retained austenite as a secondary phase, and bainite and martensite as low-temperature transformation phases, and a method of improving the ductility and stretch-flangeability of the multi-phase steel sheet. According to the technique disclosed in Patent Document 2, however, since large amounts of silicon (Si) and aluminum (Al) are added to ensure the formation of retained austenite, it is difficult to ensure plating quality, and the surface quality of steel is not guaranteed during a steel making process and a continuous casting process. In addition, the initial yield strength (YS) of the multi-phase steel sheet of Patent Document 2 is high because of transformation-induced plasticity, and thus the yield ratio of the multi-phase steel is high.

Patent Document 3 (Korean Patent Application Laid-open Publication No.: 2002-0073564) discloses a high tensile hot-dip galvanized steel sheet having satisfactory workability and including soft ferrite and hard martensite in the microstructure thereof, and a method of manufacturing the steel sheet while improving the elongation and r value (Lankford value) of the steel sheet. However, since the technique disclosed in Patent Document 3 requires the addition of a large amount of silicon (Si), it is difficult to obtain a high degree of galvanizing quality. In addition, since the technique requires the addition of large amounts of titanium (Ti) and molybdenum (Mo), manufacturing costs are high.

DISCLOSURE

Technical Problem

An aspect of the present disclosure may provide a hot-dip galvanized steel sheet or hot-dip galvannealed steel sheet so as to address the above-described limitations of the related art. The hot-dip galvanized steel sheet or hot-dip galvannealed steel sheet has an optimized composition and is produced under optimized manufacturing conditions to improve the hole expansion ratio (HER) of the steel sheet and adjust the tensile strength of the steel sheet to be within the range of 450 MPa to 650 MPa for use of the steel sheet in the manufacturing of automotive outer panels.

An aspect of the present disclosure may also provide a method of manufacturing the hot-dip galvanized steel sheet.

However, aspects of the present disclosure are not limited thereto. Additional aspects will be set forth in part in the description which follows, and will be apparent from the description to those of ordinary skill in the related art.

Technical Solution

According to an aspect of the present disclosure, a hot-dip galvanized steel sheet having an improved hole expansion ratio (HER) may include a base steel sheet and a hot-dip galvanized layer formed on the base steel sheet, the base steel sheet including, by wt %, carbon (C):0.02% to 0.08%, manganese (Mn):1.3% to 2.1%, silicon (Si):0.3% or less (excluding 0%), chromium (Cr):1.0% or less (excluding 0%), phosphorus (P):0.1% or less (excluding 0%), sulfur (S): 0.01% or less (excluding 0%), nitrogen (N):0.01% or less (excluding 0%), acid soluble aluminum (sol.Al): 0.02% to 0.06%, molybdenum (Mo):0.2% or less (excluding 0%), boron (B):0.003% or less (excluding 0%), and a balance of iron (Fe) and inevitable impurities, wherein the base steel sheet may have a microstructure including 90% or more by area of ferrite, 3% or less by area of bainite as described in Formula 1 below, and martensite as a remainder, wherein the base steel sheet may have an a/b ratio of 0.7 or less, where (a) refers to a C+Mn content of a matrix of the base steel sheet in a surface region defined up to an average depth of 10 μm, and (b) refers to a C+Mn content of the matrix at a ¼ thickness position of the base steel sheet, $$B(\%)=\{BA/(FA+MA+BA)\}\times 100 \quad \text{[Formula 1]}$$

where FA: ferrite area, BA: bainite area, and MA: martensite area.

The base steel sheet may have a c/d ratio of 0.8 or less, where (c) refers to a martensite area fraction of the matrix of the base steel sheet in the surface region defined up to an average depth of 10 μm, and (d) refers to a martensite area fraction of the matrix of the base steel sheet at the ¼ thickness position of the base steel sheet.

The base steel sheet may have an e/f ratio of 0.95 or less, where (e) refers to a C+Mn content of martensite in the surface region of the base steel sheet defined up to an average depth of 10 μm, and (f) refers to a C+Mn content of martensite at the ¼ thickness position of the base steel sheet.

The base steel sheet may have a g/h ratio of 1.2 or greater, where (g) refers to a ferrite grain size in the surface region of the base steel sheet defined up to an average depth of 10 μm, and (h) refers to a ferrite grain size at the ¼ thickness position of the base steel sheet.

The hot-dip galvanized layer of the hot-dip galvanized steel sheet may be subjected to an alloying treatment process to form the hot-dip galvanized steel sheet as a hot-dip galvannealed steel sheet.

According to another aspect of the present disclosure, a method of manufacturing a hot-dip galvanized steel sheet having an improved HER may include: preparing a steel slab having the above-described composition and reheating the steel slab; performing a finish hot rolling process on the reheated steel slab within a temperature range of Ar3+50° C. to 950° C. to form a hot-rolled steel sheet, and coiling the hot-rolled steel sheet within a temperature range of 450° C. to 700° C.; cold rolling the coiled steel sheet with a reduction ratio of 40% to 80%, and continuously annealing the cold-rolled steel sheet in a furnace while maintaining a partial pressure of hydrogen in the furnace as expressed by $-4.0 \leq \log(PH2O/PH2) \leq 2.0$, wherein in the continuous annealing, the cold-rolled steel sheet is first heated to a temperature of 560° C. to 680° C. at an average heating rate of 4° C./s or greater and is secondarily heated to a temperature of 760° C. to 850° C. at an average heating rate of 2° C./s or less; first cooling the continuously annealed steel sheet to a temperature range of 630° C. to 670° C. at an average cooling rate of 2° C./s to 8° C./s and secondarily cooling the steel sheet to a temperature ranging from Ms+20° C. to Ms+50° C. at an average cooling rate of 3° C./s to 10° C./s; and performing a hot-dip galvanizing process on the secondarily cooled steel sheet within a temperature range of 440° C. to 480° C., and cooling the hot-dip galvanized steel sheet to a temperature of Ms−100° C. or lower at an average cooling rate of 4° C./s or greater.

According to another aspect of the present disclosure, a method of manufacturing a hot-dip galvannealed steel sheet having an improved HER may include: preparing a steel slab having the above-described composition and reheating the steel slab; performing a finish hot rolling process on the reheated steel slab within a temperature range of Ar3+50° C. to 950° C. to form a hot-rolled steel sheet, and coiling the hot-rolled steel sheet within a temperature range of 450° C. to 700° C.; cold rolling the coiled steel sheet with a reduction ratio of 40% to 80%, and continuously annealing the cold-rolled steel sheet in a furnace while maintaining a partial pressure of hydrogen in the furnace as expressed by $-4.0 \leq \log(PH2O/PH2) \leq -2.0$, wherein in the continuous annealing, the cold-rolled steel sheet is first heated to a temperature of 560° C. to 680° C. at an average heating rate of 4° C./s or greater and is secondarily heated to a temperature of 760° C. to 850° C. at an average heating rate of 2° C./s or less; first cooling the continuously annealed steel sheet to a temperature range of 630° C. to 670° C. at an average cooling rate of 2° C./s to 8° C./s and secondarily cooling the steel sheet to a temperature ranging from Ms+20° C. to Ms+50° C. at an average cooling rate of 3° C./s to 10° C./s; and performing a hot-dip galvanizing process on the secondarily cooled steel sheet within a temperature range of 440° C. to 480° C., performing an alloying heat treatment process on the steel sheet, and cooling the steel sheet to a temperature of Ms−100° C. or lower at an average cooling rate of 4° C./s or greater.

A base steel sheet of the hot-dip galvanized steel sheet may have a microstructure including 90% or more by area of ferrite, 3% or less by area of bainite as described in Formula 1 below, and martensite as a remainder, and the base steel sheet may have an a/b ratio of 0.7 or less, where (a) refers to a C+Mn content of a matrix of the base steel sheet in a surface region defined up to an average depth of 10 μm, and (b) refers to a C+Mn content of the matrix at a ¼ thickness position of the base steel sheet, $$B(\%)=\{BA/(FA+MA+BA)\}\times 100 \quad \text{[Formula 1]}$$

where FA: ferrite area, BA: bainite area, and MA: martensite area.

The base steel sheet of the hot-dip galvanized steel sheet may have a c/d ratio of 0.8 or less, where (c) refers to a martensite area fraction of the matrix of the base steel sheet in the surface region defined up to an average depth of 10 μm, and (d) refers to a martensite area fraction of the matrix at the ¼ thickness position of the base steel sheet.

The base steel sheet of the hot-dip galvanized steel sheet may have an e/f ratio of 0.95 or less, where (e) refers to a C+Mn content of martensite in the surface region of the base steel sheet defined up to an average depth of 10 μm, and (f)

refers to a C+Mn content of martensite at the ¼ thickness position of the base steel sheet.

The base steel sheet of the hot-dip galvanized steel sheet may have a g/h ratio of 1.2 or greater, where (g) refers to a ferrite grain size in the surface region of the base steel sheet defined up to an average depth of 10 μm, and (h) refers to a ferrite grain size at the ¼ thickness position of the base steel sheet.

The partial pressure of hydrogen may satisfy $-3.0 \leq \log(P_{H2O}/P_{H2}) \leq -2.5$.

Advantageous Effects

According to the aspects of the present disclosure, both the strength and hole expansion ratio (HER) of the hot-dip galvanized steel sheet or hot-dip galvannealed steel sheet may be improved, and thus the steel sheet may be used to manufacture automotive outer panels requiring a high degree of workability.

DESCRIPTION OF DRAWINGS

FIG. 1 is a graph illustrating the contents of C and Mn in a surface region and at a ¼ thickness position of a base steel sheet of a hot-dip galvannealed steel sheet of an example of the present disclosure.

FIG. 2 is a graph illustrating the contents of C and Mn (using a TEM) in the surface region and a central region (¼ thickness position) of the base steel sheet of the hot-dip galvanized steel sheet of the example of the present disclosure.

FIG. 3 is a scanning electron microscope (SEM) image illustrating the microstructures of a plating layer and the base steel sheet of the hot-dip galvanized steel sheet of the example of the present disclosure.

FIG. 4 is a graph illustrating the contents of C and Mn in martensite in the surface region and the central region (¼ thickness position) of the base steel sheet of the hot-dip galvannealed steel sheet of the example of the present disclosure.

BEST MODE

The inventors have conducted significant research into developing steel sheets having a high degree of strength and a high hole expansion ratio (HER) guaranteeing formability, in order to provide steel sheets suitable for manufacturing automotive outer panels. As a result, the inventors have found that multi-phase steel sheets having desired properties could be obtained by optimizing alloying element contents and manufacturing conditions, and based on this knowledge, the inventors have invented the present invention.

Embodiments of the present disclosure will now be described in detail.

First, a hot-dip galvanized steel sheet or hot-dip galvannealed steel sheet having an improved HER will be described according to an exemplary embodiment of the present disclosure.

According to the exemplary embodiment of the present disclosure, the hot-dip galvanized steel sheet includes, by wt %, carbon (C): 0.02% to 0.08%, manganese (Mn): 1.3% to 2.1%, silicon (Si): 0.3% or less (excluding 0%), chromium (Cr): 1.0% or less (excluding 0%), phosphorus (P): 0.1% or less (excluding 0%), sulfur (S): 0.01% or less (excluding 0%), nitrogen (N): 0.01% or less (excluding 0%), acid soluble aluminum (sol.Al): 0.02% to 0.06%, molybdenum (Mo): 0.2% or less (excluding 0%), boron (B): 0.003% or less (excluding 0%), and a balance of iron (Fe) and inevitable impurities.

The reasons why the alloying composition of the hot-dip galvanized steel sheet or hot-dip galvannealed steel sheet is regulated as described above will now be described in detail. In the following description, the content of each component is given in wt % unless otherwise specified.

Carbon (C): 0.02% to 0.08%

Carbon (C) is an element for manufacturing a multi-phase steel sheet. Carbon (C) forms martensite in a steel sheet as one of dual phases, thereby guaranteeing the strength of the steel sheet. Generally, as the content of carbon (C) in steel increases, martensite is easily formed in the steel, and thus a multi-phase microstructure is easily formed in the steel. However, the content of carbon (C) has to be properly adjusted to obtain an intended degree of strength and a yield ratio (YS/TS).

In particular, as the content of carbon (C) increases, transformation to bainite may also occur when steel is cooled after an annealing process, and thus the yield ratio of the steel may increase. In the exemplary embodiment of the present disclosure, the formation of martensite is properly controlled while minimizing the formation of bainite, so as to obtain intended properties.

Therefore, preferably, the content of carbon (C) in the steel sheet may be adjusted to be 0.02% or greater. If the content of carbon (C) is less than 0.02%, it may be difficult to obtain an intended strength of about 450 MPa and to form martensite in a proper amount. On the other hand, if the content of carbon (C) is greater than 0.08%, the formation of bainite may be facilitated along grain boundaries during a cooling process after an annealing process. In this case, the yield strength of the steel sheet may increase to result in a high yield ratio (YS/TS), and thus bending and surface defects may easily occur during a machining process for manufacturing an automotive component. Therefore, in the exemplary embodiment of the present disclosure, the content of carbon (C) may preferably be adjusted with a range of 0.02% to 0.08%, and in terms of guaranteeing a proper degree of strength, it may be more preferable that the content of carbon (C) be within a range of 0.03% to 0.06%.

Manganese (Mn): 1.3% to 2.1%

Manganese (Mn) is an element improving the hardenability of a multi-phase steel sheet. Particularly, manganese (Mn) leads to the formation of martensite. Manganese (Mn) increases the strength of solid solution strengthened steel by the effect of solid-solution strengthening. In addition, manganese (Mn) causes the precipitation of inevitably added sulfur (S) in the form of MnS, and thus prevents fractures and high temperature embrittlement caused by sulfur (S) during a hot rolling process.

In the exemplary embodiment of the present disclosure, manganese (Mn) may preferably be added in an amount of 1.3% or greater. If the content of manganese (Mn) is less than 1.3%, martensite may not be formed, and thus it may be difficult to manufacture multi-phase steel. Conversely, if the content of manganese (Mn) is greater than 2.1%, unstable microstructures may be formed due to the excessive amount of manganese (Mn), and Mn-bands (Mn oxide bands) increasing the possibility of cracking and fractures may be formed. In addition, Mn oxides may be eluted and present on the surface of steel during an annealing process, and thus the platability of the steel may be significantly lowered. Therefore, in the exemplary embodiment of the present disclosure, it may be preferable that the content of manganese (Mn) be adjusted with a range of 1.3% to 2.1%, and more preferably within a range of 1.4% to 1.8%.

Chromium (Cr): 1.0% or Less (Excluding 0%)

Chromium (Cr) an element having characteristics similar to the above-described characteristics of manganese (Mn). Chromium (Cr) is added to steel to increase the hardenability and strength of the steel. Chromium (Cr) is effective in facilitating the formation of martensite. Chromium (Cr) forms coarse Cr-containing carbides such as $Cr_{23}C_6$ during a hot rolling process, thereby leading to the precipitation of carbon (C) dissolved in steel and adjusting the amount of dissolved carbon (C). Thus, chromium (Cr) suppresses yield point elongation (YP-El) and makes it easy to manufacture multi-phase steel having a low yield ratio. In addition, chromium (Cr) minimizes the decrease of elongation of steel when increasing the strength of the steel, and thus makes it easy to manufacture multi-phase steel having a high degree of ductility.

In the exemplary embodiment of the present disclosure, chromium (Cr) facilitates the formation of martensite in the steel sheet by improving the hardenability of the steel sheet. However, if the content of chromium (Cr) is greater than 1.0%, martensite may be excessively formed, and thus the strength and elongation of the steel sheet may decrease. Therefore, in the exemplary embodiment of the present disclosure, the content of chromium (Cr) may preferably be adjusted to be 1.0% or less (excluding 0% by taking into account the amount of chromium (Cr) inevitably added).

Silicon (Si): 0.3% or Less (Excluding 0%)

Generally, during a cooling process after an annealing process, silicon (Si) leads to the formation of a proper amount of retained austenite, and thus significantly improves the elongation of steel. However, this occurs when the content of carbon (C) is relatively high at about 0.6%. In addition, silicon (Si) improves the strength of steel by solid-solution strengthening. However, if the content of silicon (Si) in a hot-dip galvanized steel sheet is excessively high, it is known that the surface quality of the hot-dip galvanized steel sheet is improved degraded.

In the exemplary embodiment of the present disclosure, the content of silicon (Si) is adjusted within the range of 0.3% or less (excluding 0%), in order to guarantee an intended degree of strength and improve elongation. Even though silicon (Si) is not added, intended characteristics may be obtained. However, since silicon (Si) is inevitably added during manufacturing processes, the content of silicon (Si) is not 0%. If the content of silicon (Si) is greater than 0.3%, the surface quality of a plating layer deteriorates, and the effect of forming multi-phase steel is not obtained.

Phosphorus (P): 0.1% or Less (Excluding 0%)

In steel, phosphorus (P) is the most effective element in guaranteeing strength without decreasing formability. However, if the content of phosphorus (P) is too high, the possibility of brittle fractures increases significantly, and thus slabs of steel may fracture during a hot rolling process. In addition, an excessive amount of phosphorus (P) degrades the surface quality of plating.

Therefore, in the exemplary embodiment of the present disclosure, the content of phosphorus (P) is adjusted to be 0.1% or less, but is not 0% because of the amount inevitably added.

Sulfur (S): 0.01% or Less (Excluding 0%)

Sulfur (S) is an impurity inevitably included in steel, and the content of sulfur (S) is adjusted to as low an amount as possible. Particularly, sulfur (S) contained in steel increases the possibility of red brittleness, and thus it may be preferable that the content of sulfur (S) be adjusted to be 0.01% or less. However, the content of sulfur (S) is not 0% because sulfur (S) is inevitably included during manufacturing processes.

Nitrogen (N): 0.01% or Less (Excluding 0%)

Nitrogen (N) is an impurity inevitably included in steel. Although it is required to keep the content of nitrogen (N) in steel as low as possible, this significantly increases refining costs. Therefore, it may be preferable to keep the content of nitrogen (N) within the range of 0.01% or less in consideration of process conditions. However, the content of nitrogen (N) is not 0% because of the amount inevitably included.

Sol.Al: 0.02% to 0.06%

Acid soluble aluminum (sol.Al) is an element added to decrease the grain size of steel and remove oxygen. If the content of sol.Al is less than 0.02%, aluminum (Al)-killed steel may not be stably manufactured. On the other hand, if the content of sol.Al in steel is greater than 0.06%, although the strength of the steel may be increased by grain refinement, inclusions may be excessively formed in the steel during a continuous casting process of steel making processes. In this case, surface defects may be easily formed on a hot-dip galvanized steel sheet. In addition, manufacturing costs may increase. Therefore, it may be preferable that the content of sol.Al be within the range of 0.02% to 0.06%.

Molybdenum (Mo): 0.2% or Less (Excluding 0%)

Molybdenum (Mo) added to steel delays the transformation of austenite to pearlite and leads to ferrite grain refinement and an increase in strength. Molybdenum (Mo) added to steel improves hardenability and facilitates the formation of fine martensite along grain boundaries, thereby enabling the adjustment of the yield ratio of the steel. However, since molybdenum (Mo) is expensive, the content of molybdenum (Mo) is economically adjusted.

To obtain the above-described effects, it may be preferable that the upper limit of the content of molybdenum (Mo) be 0.2%. If the content of molybdenum (Mo) is greater than 0.2%, alloying costs increase significantly to lower economical feasibility, and the ductility of the steel sheet is also lowered. In the exemplary embodiment of the present disclosure, the optimal content of molybdenum (Mo) is about 0.05%. However, intended characteristics of the steel sheet may be obtained even though molybdenum (Mo) is not added to the steel sheet. The content of molybdenum (Mo) is not 0% because molybdenum (Mo) is inevitably included during manufacturing processes.

Boron (B): 0.003% or Less (Excluding 0%)

Boron (B) is added to steel to prevent secondary working embrittlement caused by the addition of phosphorus (P). If the content of phosphorus (P) in steel is greater than 0.003%, the elongation of the steel is lowered, and thus the content of boron (B) is adjusted to be 0.003% or less. However, the content of boron (B) is not 0% because of the amount inevitably included.

In the exemplary embodiment of the present disclosure, the hot-dip galvanized steel sheet may further include iron (Fe) and inevitable impurities in addition to the above-described components.

In the exemplary embodiment of the present disclosure, a base steel sheet of the hot-dip galvanized steel sheet or hot-dip galvannealed steel sheet having the above-described composition may have a microstructure including ferrite as a main phase and martensite as a remainder. In addition, the microstructure of the base steel sheet may further include bainite. However, the amount of bainite may be adjusted as low as possible (if possible, to be zero). Preferably, the base steel sheet may have a microstructure including 90% or more by area of ferrite, 3% or less by area of bainite B as described by Formula 1 below, and martensite as a remainder.

Preferably, the base steel sheet may have 90% or greater by area of ferrite, and 1% to 10% by area of a dual-phase microstructure of martensite and bainite, at a ¼ thickness position based on the total thickness of the base steel sheet. If the dual-phase microstructure has an area fraction of less than 1%, it may be difficult to form the base steel sheet as a multi-phase steel sheet having a low yield ratio. If the dual-phase microstructure has an area fraction of greater than 10%, the strength of the base steel sheet may be too high, and thus it may be difficult to obtain an intended degree of workability.

According to results of experiments conducted by the inventors, it is more preferable that the area fraction of martensite be within the range of 2% to 5% at the ¼ thickness position of the base steel sheet. This is a condition for obtaining a steel sheet having a low yield ratio and an improved degree of ductility by adjusting the content of fine martensite. As shown in Formula 1 below, the base steel sheet may not include bainite. However, if the base steel sheet inevitably includes bainite, the area fraction of bainite may be 3% or less. If the area fraction of bainite is greater than 3%, the content of carbon (C) may increase around bainite grains. In this case, the ductility of the base steel sheet may deteriorate, and the yield ratio of the base steel sheet may increase. That intended effects of the exemplary embodiment of the present disclosure may not be obtained.

$$B(\%) = \{BA/(FA+MA+BA)\} \times 100 \qquad \text{[Formula 1]}$$

where FA: ferrite area, BA: bainite area, and MA: martensite area.

In the exemplary embodiment of the present disclosure, the area fraction of bainite of the dual-phase microstructure is adjusted to be low. The reason for this is that when bainite is compared to martensite, carbon (C) and nitrogen (N) dissolved in bainite grains are easily fixed to dislocations and hinder movements of the dislocations, leading to discontinuous yield behavior and a significant increase in the yield ratio of the base steel sheet.

Therefore, if the area fraction of bainite of the dual-phase microstructure is 3% or less, the yield ratio of the base steel sheet may be maintained at 0.57 or less before a temper rolling process, and the yield ratio of the base steel sheet may be adjusted to an intended value through the temper rolling process. If the area fraction of bainite is greater than 3%, the yield ratio of the base steel sheet may be greater than 0.57 before a temper rolling process, and the base steel sheet may not be formed as a multi-phase steel sheet having a low yield ratio, and the ductility of the base steel sheet may also be decreased.

In addition, the base steel sheet of the hot-dip galvanized steel sheet of the exemplary embodiment may have a matrix of ferrite and a secondary phase, and the base steel sheet may have an a/b ratio of 0.7 or less, where (a) refers to a C+Mn content of the matrix of the base steel sheet in a surface region of the base steel sheet defined up to an average depth of 10 μm, and (b) refers to a C+Mn content of the matrix at a ¼ thickness position of the base steel sheet.

This is a condition for manufacturing multi-phase steel having an improved HER. Automotive parts having complex shapes may be cracked at machined edge portions because of a low HER. Cracks start from the surfaces of steel sheets and develop gradually toward the centers of the steel sheets. According to results of research conducted by the inventors, if the content of C+Mn is properly adjusted in the surface region and at the ¼ thickness position of the base steel sheet, the propagation of cracks is suppressed, and the HER of the base steel sheet is improved.

Preferably, the base steel sheet may have an a/b ratio of 0.7 or less, where (a) refers to a C+Mn content of the ferrite and secondary phase matrix of the base steel sheet in the surface region defined up to an average depth of 10 μm, and (b) refers to a C+Mn content of the ferrite and secondary phase matrix at the ¼ thickness position of the base steel sheet. As the a/b ratio of the base steel sheet decreases, the HER of the base steel sheet improves. Thus, the lower limit of the a/b ratio is not specified. Although the a/b ratio exceeds 0.7, the HER of the base steel sheet is not significantly improved. Thus, the upper limit of the a/b ratio is set to 0.7.

Furthermore, in the exemplary embodiment of the present disclosure, the base steel sheet of the hot-dip galvanized steel sheet or hot-dip galvannealed steel sheet may preferably have a c/d ratio of 0.8 or less, where (c) refers to a martensite fraction of the microstructure of the base steel sheet in the surface region defined up to an average depth of 10 μm, and (d) refers to a martensite fraction of the microstructure of the base steel sheet at the ¼ thickness position of the base steel sheet. This is a condition for improving the HER of the base steel sheet by suppressing the formation of martensite in the surface region of the base steel sheet. As the amount of martensite decreases, the hardness difference between ferrite and martensite may decrease, and thus the HER of the base steel sheet may be improved in the surface region of the base steel sheet. The lower limit of the c/d ratio is not specified. However, if the c/d ratio exceeds 0.8, the martensite fraction does not differ considerably between the surface region and the ¼ thickness position, and thus the HER of the base steel sheet may not be improved.

Furthermore, in the exemplary embodiment of the present disclosure, the base steel sheet of the hot-dip galvanized steel sheet or hot-dip galvannealed steel sheet may preferably have an e/f ratio of 0.95 or less, where (e) refers to a C+Mn content of martensite in the surface region of the base steel sheet defined up to an average depth of 10 μm, and (f) refers to a C+Mn content of martensite at the ¼ thickness position of the base steel sheet. This is a condition for improving the HER of the base steel sheet by decreasing the content of C+Mn in martensite as much as possible, the hardness of martensite in the surface region, and the hardness difference between martensite and a ferrite matrix. However, if the e/f ratio exceeds 0.95, the difference of martensite hardness between the surface region and the ¼ thickness position (central region) is not significant, and the HER improvement effect is low.

In the exemplary embodiment of the present disclosure, the base steel sheet of the hot-dip galvanized steel sheet or hot-dip galvannealed steel sheet may preferably have a g/h ratio of 1.2 or greater where (g) refers to a ferrite grain size in the surface region of the base steel sheet defined up to an average depth of 10 μm, and (h) refers to a ferrite grain size at the ¼ thickness position of the base steel sheet. This leads to decarbonization in the surface region of the base steel sheet; that is, a decrease in the amount of carbon (C). Thus, the grain size of ferrite increases in the surface region of the base steel sheet, thereby improving the ductility in the surface region of the base steel sheet and thus the HER of the base steel sheet. However, if the g/h ratio is less than 1.2, the grain size of ferrite in the surface region may be similar to the grain size of ferrite at the ¼ thickness position, and the HER improvement effect may not be obtained.

As described above, in the exemplary embodiment of the present disclosure, the ductility of the base steel sheet is increased by increasing the grain size of ferrite in the surface region of the base steel sheet, and the hardness difference between phases (ferrite and martensite) of the surface region of the base steel sheet is reduced by properly adjusting the content of C+Mn in the matrix (F+M), particularly the content of C+Mn in martensite. Therefore, the hot-dip galvanized steel sheet or hot-dip galvannealed steel sheet may have an improved HER.

Next, an explanation will be given of a method of manufacturing a hot-dip galvanized or hot-dip galvannealed steel sheet having an improved HER and a low yield ratio according to an exemplary embodiment of the present disclosure.

First, a steel slab having the above-described composition is prepared and reheated. The reheating process is performed to smoothly perform a subsequent hot rolling process and sufficiently obtain intended characteristics. In the exemplary embodiment of the present disclosure, conditions for the reheating process are not limited. For example, general conditions for reheating processes may be used. For example, the reheating process may be performed within the temperature range of 1100° C. to 1300° C.

In the exemplary embodiment of the present disclosure, after the reheating process, a finish hot rolling process is performed on the reheated steel slab within the temperature range of Ar3+50° C. to 950° C. At this time, preferably, the finish hot rolling process may be performed on the reheated steel slab within the temperature range of Ar3+50° C. to 950° C. where Ar3 is defined by Formula 2 below. In general, the finish hot rolling process is performed on the reheated steel slab within an austenitic single phase temperature range. If the finish hot rolling process is performed within the austenitic single phase temperature range, the microstructure of the steel slab basically constituted by single-phase grains may be uniformly deformed, and thus the uniformity of the microstructure of the steel slab may be improved. If the finish hot rolling temperature is lower than Ar3+50° C., the steel slab may have a dual-phase microstructure of ferrite and austenite, and thus the microstructure of the steel slab may not be uniform after the finish hot rolling process. Conversely, if the finish hot rolling temperature is higher than 950° C., abnormally coarse grains resulting in a non-uniform microstructure may be formed during high-temperature rolling, and thus when the hot-rolled steel slab (steel sheet) is cooled and coiled, the hot-rolled steel sheet may be twisted.

$$Ar3=910-310*C-80*Mn-20*Cu-15*Cr-55*Ni-80*Mo \quad \text{[Formula 2]}$$

where Ar3 refers to a theoretical temperature.

After the finish hot rolling process, the hot-rolled steel sheet is coiled within the temperature range of 450° C. to 700° C. If the coiling temperature is lower than 450° C., an excessive amount of martensite or bainite may be formed in the hot-rolled steel sheet, and thus the strength of the hot-rolled steel sheet may excessively increase. In this case, an excessive rolling load may be applied to the hot-rolled steel sheet in a later cold rolling process, and thus shape errors may occur. Conversely, if the coiling temperature is higher than 700° C., elements such as silicon (Si), manganese (Mn), and boron (B) which decrease the wettability of the hot-rolled steel sheet during a hot-dip galvanizing process may be concentrated on the surface of the hot-rolled steel sheet. Therefore, it may be preferable that the coiling temperature be adjusted to be within the range of 450° C. to 700° C. Next, a pickling process may be performed on the coiled hot-rolled steel sheet under normal conditions.

According to the exemplary embodiment of the present disclosure, a cold rolling process is performed on the coiled hot-rolled steel sheet at a reduction ratio of 40% to 80%. Preferably, the reduction ratio of the cold rolling process may be within the range of 40% to 80%. If the reduction ratio is lower than 40%, it may be difficult to obtain an intended steel sheet thickness and to correct the shape of the steel sheet. Conversely, if the reduction ratio is greater than 80%, cracks may be easily formed at edge portions of the steel sheet, and the load of the cold rolling process may increase.

Next, according to the exemplary embodiment of the present disclosure, a continuous annealing process is performed on the cold rolled steel sheet in a furnace while maintaining the partial pressure of hydrogen in the furnace as expressed by $-4.0 \le \log(PH2O/PH2) \le -2.0$. In the continuous annealing process, the cold-rolled steel sheet is first heated at an average heating rate of 4° C./s or greater to a temperature of 560° C. to 680° C. and is secondarily heated at an average heating rate of 2° C./s or less to a temperature of 760° C. to 850° C.

In the exemplary embodiment of the present disclosure, the furnace used in the continuous annealing process may be a continuous annealing furnace or a continuous plating and alloying furnace, and a heating temperature, a heating rate, and the partial pressure of hydrogen in the furnace may be adjusted to sufficiently induce decarbonization reaction in the surface region of the steel sheet. That is, the heating rate may be adjusted according to annealing temperature ranges so as to promote a decarbonization reaction in the surface region of the steel sheet.

Specifically, in the exemplary embodiment of the present disclosure, the cold-rolled steel sheet may be first heated at an average heating rate of 4° C./s or greater to a temperature of 560° C. to 680° C. These conditions may be optimal conditions in terms of productivity and decarbonization. If the first heating temperature is lower than 560° C., although the heating rate is low, decarbonization may not sufficiently occur because the activity of carbon (C) is low in the microstructure of the steel sheet. In addition, although the heating rate is increased within a low temperature range, productivity may not increase. Conversely, if the first heating temperature is higher than 680° C., although decarbonization occurs actively in the surface region of the steel sheet, the decarbonization may not be sufficient because the heating rate is 4° C./s or greater.

The upper limit of the first heating rate is not specified because productivity increases as the first heating rate increases. However, if the first heating rate is lower than 4° C./s, productivity may decrease, and thus the steel sheet may not be economically produced.

In the exemplary embodiment of the present disclosure, the first heating temperature and the first heating rate are rapid heating conditions for increasing decarbonization and productivity in the second heating.

After the first heating, the cold-rolled steel sheet is secondarily heated to a temperature ranging from 760° C. to 850° C. at an average heating rate of 2° C./s or less. The second heating is for inducing the formation of ferrite and austenite and the distribution of carbon (C) simultaneously with recrystallization. If the second heating temperature is lower than 760° C., recrystallization may insufficiently occur, and austenite may not be sufficiently formed. Therefore, the steel sheet may not have an intended degree of strength. Conversely, if the second heating temperature is higher than 850° C., productivity may decrease, and austenite may be excessively formed. Due to the excessive austenite, bainite may be preset after cooling, and thus the ductility of the steel sheet may decrease.

Therefore, in the exemplary embodiment of the present disclosure, it may be preferable that the second heating temperature be adjusted to be within a range of 760° C. to 850° C. to ensure a sufficient time for decarbonization in the surface region of the steel sheet. More preferably, the second heating temperature may be adjusted to be within a range of 770° C. to 810° C. Although the temperature range is included in a dual phase (ferrite+austenite) temperature range, it may be preferable that the temperature range be included in a temperature range in which ferrite is more abundant. As the initial amount of ferrite increases in a dual phase annealing temperature range, the growth of grains is facilitated after annealing, and thus the ductility of the steel sheet is improved. In addition, if the martensite start (Ms) temperature decreases owing to an increased concentration of carbon (C) in austenite, when the steel sheet is finally cooled after a hot-dip galvanizing process in a plating pot, martensite may be formed in the steel sheet. In this case, a large amount fine martensite may be uniformly distributed in grains, and thus the steel sheet may have a high degree of ductility and a low yield ratio. As the second heating temperature decreases, the diffusion of carbon (C) from ferrite to austenite is promoted (the degree of saturation of carbon (C) is higher in austenite than in ferrite). Thus, the ductility of the steel sheet may increase because the formation of fine martensite is facilitated as the amount of austenite having a high carbon concentration increases.

In the exemplary embodiment of the present disclosure, the second heating is performed at a heating rate of 2° C./s or less until the steel sheet is heated to a temperature of 760° C. to 850° C., to ensure a sufficient time for decarbonization in the surface region of the steel sheet during annealing. If the heating rate is higher than 2° C./s, decarbonization reaction may not sufficiently occur. Therefore, it may be preferable that the upper limit of the heating rate be set to 2° C./s.

In the exemplary embodiment of the present disclosure, during the continuous annealing process including the above-described first heating and the second heating, it may be preferable that the partial pressure of hydrogen in the atmosphere of the furnace be adjusted to within the range of −4.0≤log(PH2O/PH2)≤−2.0, to lead to a sufficient decarbonization reaction in the surface region of the steel sheet. More preferably, the partial pressure of hydrogen may be adjusted to be within the range of −3.0≤log(PH2O/PH2)≤−2.5. If the amount of oxygen (O) in the furnace is adjusted according to this condition, a reaction (decarbonization reaction) between oxygen (O) and carbon (C) included in the surface region of the steel sheet may be facilitated. If log(PH2O/PH2) is less than −4, the amount of oxygen (O) in the furnace is insufficient, and thus the reaction between oxygen (O) and carbon (C) may not sufficiently occur, causing insufficient decarbonization. Conversely, if log (PH2O/PH2) is greater than −2.0, since the amount of oxygen (O) is excessive in the furnace, even though decarbonization is facilitated, elements such as silicon (Si) or manganese (Mn) contained in the base steel sheet may also be deposited on the surface of the base steel sheet in the form of Si or Mn oxides. This retards an alloying reaction and has a negative effect on chemical conversion treatment, and thus surface characteristics of plating may be degraded.

In the exemplary embodiment of the present disclosure, after the continuous annealing process, the steel sheet is first cooled at an average cooling rate of 2° C./s to 8° C./s to a temperature range of 630° C. to 670° C. In the exemplary embodiment of the present disclosure, as the first cooling temperature increases or the first cooling rate decreases, ferrite becomes more uniform, and ferrite grains become larger. Therefore, the ductility of the steel sheet may increase. During the first cooling, carbon (C) has a sufficient time for diffusing into austenite, and this has a significant effect in the exemplary embodiment of the present disclosure. In detail, carbon (C) is always movable in a dual phase region and generally diffuses to austenite having a high carbon concentration, and the diffusion of carbon (C) increases in proportion to temperature and time. Therefore, the first cooling temperature is carefully selected. If the first cooling temperature is lower than 630° C., the diffusion of carbon (C) to austenite is insufficient, and thus the content of carbon (C) in ferrite is high, making it difficult to obtain an intended degree of ductility. On the other hand, if the first cooling temperature is higher than 670° C., although the above-described effects are easily obtained, a subsequent cooling process may have to be performed at an excessively high cooling rate.

In addition, it may be preferable that the first cooling rate be within a range of 2° C./s to 8° C./s. If the first cooling rate is lower than 2° C./s, productivity may decrease due to significantly slow cooling, and if the first cooling rate is higher than 8° C./s, carbon (C) is not given sufficient time for diffusing into austenite.

In the exemplary embodiment of the particle diameter, after the first cooling, the steel sheet is secondarily cooled at an average cooling rate of 3° C./s to 10° C./s to a temperature range of Ms+20° C. to Ms+50° C. Here, Ms may be defined by Formula 3 below.

Ms(° C.)=539−423C−30.4Mn−12.1Cr−17.7Ni−7.5Mo    [Formula 3]

where Ms refers to a theoretical temperature at which martensite (M) is formed.

According to research results, if martensite is formed in a steel sheet before the steel sheet is treated within a temperature range of 440° C. to 480° C., which is a normal temperature range of a hot-dip galvanizing pot, the martensite may finally become coarse, and thus the steel sheet may not have a low yield ratio. Therefore, in the exemplary embodiment of the present disclosure, the second cooling temperature is adjusted to be within the range of Ms+20° C. to Ms+50° C., and the steel sheet is secondarily cooled as slow as possible to suppress the formation of martensite. If the second cooling temperature is lower than Ms+20° C., martensite may be formed. Conversely, if the second cooling temperature is higher than Ms+50° C., the rate of subsequent cooling may have to be increased, and thus martensite may be formed before the steel sheet is dipped into a plating pot in a later process.

In addition, preferably, the second cooling rate may be adjusted to be within the range of 3° C./s to 10° C./s. If the second cooling rate is lower than 3° C./s, productivity decreases even though martensite is not formed. Conversely, if the second cooling rate is higher than 10° C./s, problems such as twisting may occur because of a rapid sheet feed rate.

After the second cooling, a hot-dip galvanizing process is performed on the steel sheet within the temperature range of 440° C. to 480° C., and then the steel sheet is cooled to a temperature of Ms−100° C. or lower at an average cooling rate of 4° C./s or higher.

In the exemplary embodiment of the present disclosure, the hot-dip galvanizing process may be performed by dipping the secondarily cooled steel sheet in a plating pot kept at a normal temperature range of 440° C. to 480° C. In the exemplary embodiment of the present disclosure, conditions for the hot-dip galvanizing process are not limited, but it may be preferable that the secondarily cooled steel sheet be cooled at an average cooling rate of 4° C./s to 8° C./s before the secondarily cooled steel sheet is dipped into the plating pot kept within the above-mentioned temperature range. If the average cooling rate is adjusted to be within the range of 4° C./s to 8° C./s, martensite may not be formed in the steel sheet before the steel sheet is dipped into the plating pot. In detail, if the cooling rate is lower than 4° C./s, although martensite is not formed in the steel sheet, productivity may decrease. Conversely, if the cooling rate is higher than 8° C./s, martensite may be partially formed in grains, and bainite may also be formed, thereby increasing the yield strength of the steel sheet and decreasing the ductility of the steel sheet.

Thereafter, the hot-dip galvanized steel sheet is cooled to a temperature of Ms−100° C. or lower at an average cooling rate of 4° C./s or higher so that the hot-dip galvanized steel sheet may finally have fine martensite. If the cooling temperature is higher than Ms−100° C., fine martensite may not be formed unless the hot-dip galvanized steel sheet is cooled at a very high cooling rate, and shape defects may occur.

Therefore, in the exemplary embodiment of the present disclosure, the hot-dip galvanized steel sheet is cooled to a temperature of Ms−100° C. or lower at an average cooling rate of 4° C./s or higher. If the cooling rate is lower than 4° C./s, martensite may be non-uniformly formed along grain boundaries or in grains, and the ratio of grain boundary martensite to in-grain martensite may be low. In this case, the hot-dip galvanized steel sheet may not have a low yield ratio and may not be produced with a high degree of productivity.

In addition, according to the exemplary embodiment of the present disclosure, after the hot-dip galvanizing process, the hot-dip galvanized steel sheet may be reheated to a normal heat treatment temperature for inducing an alloying reaction and may then be finally cooled to a temperature range of Ms−100° C. or lower at an average cooling rate of 4° C./s or higher. In this manner, a hot-dip galvannealed steel sheet may be manufactured. Other conditions may be equal to those used to form the hot-dip galvanized steel sheet.

Mode for Invention

Hereinafter, the embodiments of the present disclosure will be described more specifically through examples.

EXAMPLES

Steel slabs having compositions shown in Table 1 were prepared, and then hot-dip galvanized or galvannealed steel sheets were manufactured using the steel slabs under the manufacturing conditions shown in Table 2. In Table 1, steel slabs 1, 2, 4, and 5 were used to manufacture hot-dip galvannealed (GA) steel sheets, and steel slabs 3 and 6 were used to manufacture hot-dip galvanized (GI) steel sheets. In addition, steel slabs 7 and 8 shown in Table 1 were used to manufacture hot-dip galvannealed (GA) steel sheets.

Properties of the hot-dip galvanized/galvannealed steel sheets manufactured as described above were measured as shown in Table 3. In the present disclosure, a steel sheet is intended to be manufactured having a yield ratio of 0.57 or less and a hole expansion ratio (HER) of 80% or greater in a state in which the steel sheet is not temper rolled.

A tension test was performed on specimens of the steel sheets in a C-direction according to a JIS test method, and microstructure fractions of each steel sheet were measured by analyzing the matrix of the steel sheet at a ¼ thickness position of the steel sheet. In detail, the area fractions of martensite and bainite were first calculated using an optical microscope by a Lepelar corrosion method. Then, the martensite and bainite were observed again using a scanning electron microscope (SEM) (at a magnification of 3000 times), and the area fractions of martensite and bainite were precisely measured by a count point method.

To measure the ratio of carbon (C) and manganese (Mn) contents in ferrite and martensite of the matrix of each base steel sheet, the base steel sheet was cut by sputtering from a plating layer formed on the base steel sheet to a ¼ thickness position of the base steel sheet using a focus ion beam (FIB) system without damaging the microstructure of the base steel sheet. Next, the contents of carbon (C) and manganese (Mn) in each phase were quantitatively evaluated by line and point methods according to energy dispersive spectroscopy (EDS) using a transmission electron microscope (TEM). In addition, HERs were measured by forming a 10-mm hole by milling, pushing a cone-shaped punch into the hole from the lower side of the hole until surface cracking starts, and comparing the original diameter of the hole with the diameter of the hole immediately before the surface cracking.

TABLE 1

| Steels | Composition (wt %) | | | | | | | | | |
|---|---|---|---|---|---|---|---|---|---|---|
| | C | Mn | Si | Cr | P | S | N | sol. Al | Mo | B |
| 1 | 0.025 | 1.65 | 0.04 | 0.74 | 0.03 | 0.005 | 0.0021 | 0.025 | 0.12 | 0.0004 |
| 2 | 0.038 | 1.71 | 0.04 | 0.482 | 0.04 | 0.005 | 0.0032 | 0.041 | 0.12 | 0.0007 |
| 3 | 0.051 | 1.58 | 0.13 | 0.45 | 0.03 | 0.006 | 0.0041 | 0.048 | 0.14 | 0.0012 |
| 4 | 0.059 | 1.57 | 0.14 | 0.88 | 0.05 | 0.006 | 0.0033 | 0.041 | 0.13 | 0.0021 |
| 5 | 0.063 | 1.51 | 0.18 | 0.38 | 0.03 | 0.003 | 0.0051 | 0.050 | 0.19 | 0.0009 |
| 6 | 0.075 | 1.41 | 0.24 | 0.09 | 0.04 | 0.004 | 0.0078 | 0.031 | 0.09 | 0.0012 |
| 7 | 0.092 | 1.18 | 0.66 | 1.13 | 0.1 | 0.005 | 0.0033 | 0.043 | 0.58 | 0.0041 |
| 8 | 0.098 | 1.16 | 0.83 | 1.25 | 0.125 | 0.007 | 0.0055 | 0.048 | 0.45 | 0.0038 |

TABLE 2

| Steels | SRT (° C.) | FT (° C.) | CT (° C.) | RR (%) | AT (° C.) | 1st HR (° C./s) | 2nd HR (° C./s) | LPP | 1st CR (° C./s) | 2nd CR (° C./s) | CRPP (° C./s) | FCR (° C./s) | Notes |
|---|---|---|---|---|---|---|---|---|---|---|---|---|---|
| 1 | 1184 | 886 | 585 | 44 | 765 | 5.2 | 1.8 | −2.6 | 2.5 | 4.2 | 4.4 | 4.4 | IE1 |
|  | 1185 | 892 | 553 | 48 | 765 | 5.3 | 1.7 | −2.5 | 2.7 | 4.5 | 4.4 | 5.7 | IE2 |
|  | 1182 | 884 | 583 | 45 | 764 | 5.2 | 1.8 | −2.5 | 2.4 | 4.3 | 4.3 | 4.8 | IE3 |
|  | 1183 | 891 | 553 | 47 | 763 | 5.4 | 1.7 | −2.5 | 2.7 | 4.5 | 4.4 | 5.6 | IE4 |
| 2 | 1183 | 913 | 474 | 62 | 775 | 4.8 | 1.6 | −2.3 | 3.4 | 3.2 | 5.2 | 6.5 | IE5 |
|  | 1185 | 923 | 472 | 63 | 781 | 4.7 | 1.9 | −3.1 | 3.5 | 3.5 | 5.3 | 6.2 | IE6 |
|  | 1184 | 911 | 475 | 62 | 778 | 4.8 | 1.5 | −2.1 | 3.3 | 3.3 | 5.0 | 6.3 | IE7 |
|  | 1184 | 924 | 475 | 61 | 780 | 4.3 | 1.9 | −3.1 | 3.4 | 3.4 | 5.1 | 6.1 | IE8 |
| 3 | 1211 | 890 | 692 | 70 | 813 | 5.6 | 1.8 | −3.3 | 4.4 | 6.1 | 6.1 | 9.1 | IE9 |
|  | 1205 | 893 | 681 | 71 | 811 | 5.3 | 1.6 | −3.2 | 4.8 | 6.2 | 6.1 | 9.3 | IE10 |
|  | 1210 | 894 | 690 | 70 | 813 | 5.5 | 1.9 | −3.3 | 4.8 | 6.5 | 6.1 | 9.6 | IE11 |
|  | 1204 | 896 | 686 | 73 | 810 | 5.4 | 1.7 | −3.1 | 4.8 | 6.2 | 6.2 | 9.1 | IE12 |
| 4 | 1185 | 939 | 583 | 76 | 741 | 3.4 | 3.2 | −2.6 | 5.2 | 8.1 | 7.3 | 5.2 | CE1 |
|  | 1186 | 943 | 586 | 74 | 811 | 5.2 | 1.8 | −2.4 | 5.4 | 8.6 | 7.4 | 7.5 | IE13 |
|  | 1188 | 946 | 589 | 73 | 816 | 5.5 | 1.9 | −2.1 | 5.3 | 8.4 | 7.2 | 7.3 | IE14 |
| 5 | 1186 | 933 | 632 | 64 | 862 | 4.8 | 1.9 | −2.8 | 6.3 | 9.3 | 9.1 | 10.3 | CE2 |
|  | 1183 | 914 | 628 | 64 | 839 | 4.5 | 1.5 | −4.2 | 6.6 | 9.2 | 10.5 | 9.1 | CE3 |
|  | 1187 | 946 | 588 | 71 | 813 | 5.3 | 1.9 | −2.2 | 5.2 | 8.4 | 7.3 | 7.2 | IE15 |
| 6 | 1211 | 892 | 675 | 65 | 840 | 5.2 | 1.8 | 0.7 | 7.2 | 8.5 | 9.1 | 5.5 | CE4 |
|  | 1209 | 887 | 675 | 67 | 838 | 6.1 | 1.7 | −1.3 | 9.3 | 12.3 | 9.5 | 8.3 | CE5 |
|  | 1186 | 949 | 591 | 74 | 818 | 5.2 | 1.8 | 2.5 | 5.4 | 8.2 | 7.6 | 7.1 | IE16 |
| 7 | 1213 | 888 | 663 | 70 | 812 | 2.8 | 3.2 | −0.6 | 2.4 | 6.4 | 11.3 | 5.5 | CE6 |
| 8 | 1193 | 896 | 668 | 72 | 813 | 4.5 | 2.8 | −2.1 | 3.5 | 6.6 | 6.3 | 5.6 | CE7 |
|  | 1197 | 884 | 678 | 76 | 781 | 5.2 | 1.8 | −2.5 | 4.1 | 7.2 | 8.2 | 3.2 | CE8 |

* SRT: slab reheating temperature,
FT: finish rolling temperature,
CT: coiling temperature,
RR: reduction ratio of cold rolling,
AT: annealing temperature,
1st HR: first heating rate,
2nd HR: second heating rate,
LPP: log(PH2O/PH2),
1st CR: first cooling rate,
2nd CR: second cooling rate,
CRPP: cooling rate in plating pot,
FCR: final cooling rate,
IE: inventive example, and
CE: comparative example

TABLE 3

| Steels | ① M (%) | ② B (%) | ③ a/b | ④ c/d | ⑤ e/f | ⑥ g/h | ⑦ YR | HER (%) | TS (MPa) | Notes |
|---|---|---|---|---|---|---|---|---|---|---|
| 1 | 2.2 | 1.4 | 0.68 | 0.75 | 0.94 | 1.25 | 0.56 | 82 | 476 | IE1 |
|  | 1.7 | 1.6 | 0.65 | 0.63 | 0.88 | 1.22 | 0.56 | 83 | 458 | IE2 |
|  | 1.8 | 1.5 | 0.63 | 0.83 | 0.89 | 1.25 | 0.55 | 82 | 448 | IE3 |
|  | 1.7 | 1.8 | 0.59 | 0.82 | 0.96 | 1.24 | 0.56 | 81 | 449 | IE4 |
| 2 | 3.4 | 1.5 | 0.66 | 0.68 | 0.92 | 1.31 | 0.57 | 84 | 512 | IE5 |
|  | 3.3 | 0.4 | 0.68 | 0.69 | 0.89 | 1.23 | 0.57 | 83 | 511 | IE6 |
|  | 2.7 | 0.9 | 0.67 | 0.77 | 0.97 | 1.26 | 0.57 | 81 | 507 | IE7 |
|  | 3.2 | 0.8 | 0.69 | 0.78 | 0.98 | 1.13 | 0.57 | 80 | 508 | IE8 |
| 3 | 4.1 | 0.2 | 0.58 | 0.74 | 0.91 | 1.22 | 0.57 | 83 | 517 | IE9 |
|  | 5.4 | 0.2 | 0.56 | 0.63 | 0.86 | 1.45 | 0.56 | 84 | 518 | IE10 |
|  | 2.3 | 0.8 | 0.56 | 0.73 | 0.97 | 1.27 | 0.56 | 81 | 511 | IE11 |
|  | 0.7 | 1.3 | 0.57 | 0.79 | 0.92 | 1.15 | 0.57 | 81 | 512 | IE12 |
| 4 | 1.9 | 3.4 | 0.72 | 0.85 | 0.85 | 1.1 | 0.63 | 78 | 608 | CE1 |
|  | 6.3 | 2.1 | 0.69 | 0.58 | 0.88 | 1.32 | 0.56 | 83 | 622 | IE13 |
|  | 3.2 | 1.8 | 0.69 | 0.88 | 0.93 | 1.16 | 0.57 | 80 | 614 | IE14 |
| 5 | 3.5 | 0.2 | 0.68 | 0.55 | 0.89 | 1.25 | 0.65 | 76 | 538 | CE2 |
|  | 3.4 | 1.3 | 0.75 | 0.82 | 0.97 | 1.01 | 0.56 | 77 | 541 | CE3 |
|  | 2.8 | 1.6 | 0.68 | 0.78 | 0.93 | 1.28 | 0.56 | 86 | 538 | IE15 |
| 6 | 1.4 | 0.6 | 0.88 | 0.87 | 0.93 | 1.12 | 0.67 | 68 | 545 | CE4 |
|  | 4.3 | 1.4 | 0.75 | 0.81 | 0.89 | 1.11 | 0.56 | 76 | 533 | CE5 |
|  | 2.9 | 0.8 | 0.67 | 0.78 | 0.92 | 1.16 | 0.56 | 81 | 529 | IE16 |

TABLE 3-continued

| Steels | ① M (%) | ② B (%) | ③ a/b | ④ c/d | ⑤ e/f | ⑥ g/h | ⑦ YR | HER (%) | TS (MPa) | Notes |
|---|---|---|---|---|---|---|---|---|---|---|
| 7 | 4.5 | 3.3 | 0.73 | 0.87 | 0.98 | 1.08 | 0.62 | 75 | 548 | CE6 |
| 8 | 4.6 | 2.8 | 0.68 | 0.85 | 0.91 | 1.05 | 0.71 | 65 | 553 | CE7 |
|   | 5.7 | 4.5 | 0.79 | 0.94 | 0.92 | 1.02 | 0.68 | 63 | 556 | CE8 |

*IE: inventive example,
CE: comparative example

In Table 3, ① refers to a martensite (M) fraction (%) in the microstructure of each steel sheet,
② refers to a bainite (B) fraction (%) in the microstructure of the steel sheet,
③ refers to an a/b ratio where (a) denotes a C + Mn content of a matrix of ferrite and a secondary phase in a surface region of the steel sheet defined up to an average depth of 10 μm, and (b) denotes a C + Mn content of the matrix at a 1/4 thickness position of the steel sheet,
④ refers to a c/d ratio where (c) denotes a martensite fraction in the surface region of the steel sheet defined up to an average depth of 10 μm, and (d) denotes a martensite fraction at the 1/4 thickness position of the steel sheet,
⑤ refers to an e/f ratio where (e) denotes a C + Mn content of martensite in the surface region of the steel sheet defined up to an average depth of 10 μm, and (f) denotes a C + Mn content of martensite at the 1/4 thickness position of the steel sheet,
⑥ refers to a g/h ratio where (g) denotes the size of ferrite grains in the surface region of the steel sheet defined up to an average depth of 10 μm, and (h) denotes the size of ferrite grains at the 1/4 thickness position of the steel sheet, and
⑦ refers to a yield ratio (YS/TS).

As shown in Tables 1 to 3, Inventive Examples 1 to 16 manufactured according to compositions and manufacturing conditions proposed in the present disclosure had a tensile strength of 450 MPa to 650 MPa, a yield ratio (YS/TS) of 0.57 or less, and an HER of 80% or greater in the tensile strength range intended in the present disclosure.

FIG. 1 illustrates the contents of C and Mn of a base steel sheet of a hot-dip galvannealed steel sheet of Inventive Example 1, measured in a surface region of the base steel sheet defined up to a depth of 10 μm and at a 1/4 thickness position of the base steel sheet through a TEM line analysis by a count point sec (CPS) method. Referring to FIG. 1, the contents of C and Mn were much lower in the surface region than at the 1/4 thickness position. FIG. 2 illustrates the contents of C and Mn in the surface region of the base steel sheet and at the 1/4 thickness position (central region) of the base steel sheet. The content of C+Mn was higher at the 1/4 thickness position than in the surface region. That is, according to analysis on the contents of C and Mn (CPS) in the surface region and at the 1/4 thickness position, the contents of C and Mn were lower in the surface region than at the 1/4 thickness region of the base steel sheet of the hot-dip galvanized steel sheet of the present disclosure. The reason for this was that the contents of C and Mn decreased in the surface region owing to decarbonization and demanganization in a furnace and the diffusion of C and Mn into a plating layer. Therefore, the ductility of the surface region of the base steel sheet increased by grain coarsening in the surface region of the base steel sheet and a decrease in the amount of martensite in the surface region of the base steel sheet. As a result, the hardness difference between ferrite and martensite decreased, and thus the HER of the base steel sheet improved.

FIG. 3 is an SEM image illustrating the microstructure of the base steel sheet of the hot-dip galvanized steel sheet of the present disclosure. The SEM image illustrates the microstructure of the base steel sheet in the surface region defined up to a depth of 10 μm and the central region of the base steel sheet. Referring to FIG. 3, ferrite coarsened in the surface region, and the amount of grain boundary martensite was markedly decreased.

FIG. 4 illustrates the contents of C and Mn in martensite in the surface region and the central region (1/4 thickness position) of the base steel sheet of the hot-dip galvanized steel sheet of FIG. 1. Referring to FIG. 4, the contents of C and Mn in martensite were lower in the surface region than in the central region. Since the contents of C and Mn in martensite were lower in the surface region than at the 1/4 thickness position of the base steel sheet, force for promoting the formation of martensite was decreased, and thus the amount of martensite was decreased. In addition, since the contents of C and Mn in martensite were lower in the surface region than at the 1/4 thickness position of the base steel sheet, the ductility of martensite was higher in the surface region than at the 1/4 thickness position of the base steel sheet, and thus the hardness difference between martensite and ferrite was decreased in the surface region. As a result, the HER of the base steel sheet improved.

However, in each of Comparative Examples 1 to 5 satisfying manufacturing conditions of the present disclosure but not satisfying compositions of the present disclosure, the contents of C and Mn were higher in the surface region than at the 1/4 thickness position of a base steel sheet, or the contents of C and Mn in martensite were higher in the surface region than at the 1/4 thickness position of the base steel sheet. Thus, the ductility of the base steel sheet was not improved in the surface region of the base steel sheet, and thus the HER of the base steel sheet was not improved.

In each of Comparative Examples 6 to 8 not satisfying compositions proposed in the present disclosure, the contents of C and Mn were higher in a surface region than at a 1/4 thickness position of a base steel sheet, or the contents of C and Mn in martensite were higher in the surface region than at the 1/4 thickness position of the base steel sheet. Thus, the ductility of the base steel sheet was not improved in the surface region of the base steel sheet, and thus the HER of the base steel sheet was not improved.

In detail, in Comparative Example 1 using steel 4, the amount of austenite was low in a dual-phase region because of a low heating rate and a low annealing temperature. As a result, the bainite (B) fraction in the final microstructure of the base steel sheet was greater than 3%, and thus the HER of the base steel sheet was low.

In the case of each of steels 7 and 8, since the content of manganese (Mn) was low, chromium (Cr) was added to facilitate the formation of martensite. However, a base steel sheet had an a/b ratio of 0.7 or greater where (a) refers to the content of C+Mn of a matrix of the base steel sheet in a surface region defined up to an average depth of 10 μm, and (b) refers to the content of C+Mn of the matrix of the base steel sheet at a ¼ thickness position of the base steel sheet. In addition, the base steel sheet had a c/d ratio of 0.8 or greater, where (c) refers to a martensite area fraction of the matrix of the base steel sheet in the surface region defined up to an average depth of 10 μm, and (d) refers to a martensite area fraction of the matrix of the base steel sheet at the ¼ thickness position. As a result, the HER of the base steel sheet was low. Although manufacturing conditions such as an annealing temperature and a heating rate were optimized for steels 7 and 8, steels 7 and 8 did not have an intended HER because steels 7 and 8 did not have compositions proposed in the present disclosure. In each of the examples, the content of C+Mn was measured using a TEM by a CPS method based on line profile in a way of counting the number of local peaks of the content of each component.

In Comparative Example 2 in which the temperature of annealing was not within the annealing temperature range proposed in the present disclosure, the amount of austenite was increased, but an intended HER was not obtained because of a high yield ratio.

While exemplary embodiments have been shown and described above, it will be apparent to those skilled in the art that modifications and variations could be made without departing from the scope of the present invention as defined by the appended claims.

The invention claimed is:

1. A hot-dip galvanized steel sheet having an improved hole expansion ratio, the hot-dip galvanized steel sheet comprising
    a base steel sheet and
    an exposed hot-dip galvanized surface layer formed on and covering the base steel sheet,
    the base steel sheet comprising, by wt %,
        carbon (C) having an amount [C] satisfying 0.02%≤[C]≤0.08%,
        manganese (Mn) having an amount [Mn] satisfying 1.3%≤[Mn]≤2.1%,
        silicon (Si) having an amount [Si] satisfying 0<[Si]≤0.3%,
        chromium (Cr) having an amount [Cr] satisfying 0<[Cr]≤1.0%,
        phosphorus (P) having an amount [P] satisfying 0<[P]≤0.1%,
        sulfur (S) having an amount [S] satisfying 0<[S]≤0.01%,
        nitrogen (N) having an amount [N] satisfying 0<[N]≤0.01%,
        acid soluble aluminum (sol. Al) having an amount [sol. Al] satisfying 0.02%≤[sol. Al]≤0.06%,
        molybdenum (Mo) having an amount [Mo] satisfying 0<[Mo]≤0.2%,
        boron (B) having an amount [B] satisfying 0<[B]≤0.003%, and
        a balance of iron (Fe) and inevitable impurities,
    wherein the base steel sheet has a microstructure comprising
        more than 90% by area of ferrite,
        3% or less by area of bainite as described in Formula 1 below, and
        martensite as a remainder,
    wherein the base steel sheet has an a/b ratio of 0.7 or less, where (a) refers to a C+Mn content of a matrix of the base steel sheet in a surface region defined up to an average depth of 10 μm, and (b) refers to a C+Mn content of the matrix at a ¼ thickness position of the base steel sheet, Bainite (%)={BA/(FA+MA+BA)}×100     [Formula 1]

where FA: ferrite area,
    BA: bainite area, and
    MA: martensite area.

2. The hot-dip galvanized steel sheet of claim 1, wherein the base steel sheet has a c/d ratio of 0.8 or less, where (c) refers to a martensite area fraction of the matrix of the base steel sheet in the surface region defined up to an average depth of 10 μm, and (d) refers to a martensite area fraction of the matrix of the base steel sheet at the ¼ thickness position of the base steel sheet.

3. The hot-dip galvanized steel sheet of claim 1, wherein the base steel sheet has an e/f ratio of 0.95 or less, where (e) refers to a C+Mn content of martensite in the surface region of the base steel sheet defined up to an average depth of 10 μm, and (f) refers to a C+Mn content of martensite at the ¼ thickness position of the base steel sheet.

4. The hot-dip galvanized steel sheet of claim 1, wherein the base steel sheet has a g/h ratio of 1.2 or greater, where (g) refers to a ferrite grain size in the surface region of the base steel sheet defined up to an average depth of 10 μm, and (h) refers to a ferrite grain size at the ¼ thickness position of the base steel sheet.

5. The hot-dip galvanized steel sheet of claim 1, wherein the hot-dip galvanized surface layer of the hot-dip galvanized steel sheet is subjected to an alloying treatment process to form the hot-dip galvanized steel sheet as a hot-dip galvannealed steel sheet.

6. A method of manufacturing a hot-dip galvanized steel sheet having an improved hole expansion ratio HER, the method comprising:
    preparing a steel slab and reheating the steel slab, the steel slab comprising, by wt %,
        carbon (C) having an amount [C] satisfying 0.02%≤[C]≤0.08%,
        manganese (Mn) having an amount [Mn] satisfying 1.3%≤[Mn]≤2.1%,
        silicon (Si) having an amount [Si] satisfying 0<[Si]≤0.3%,
        chromium (Cr) having an amount [Cr] satisfying 0<[Cr]≤1.0%,
        phosphorus (P) having an amount [P] satisfying 0<[P]≤0.1%,
        sulfur (S) having an amount [S] satisfying 0<[S]≤0.01%,
        nitrogen (N) having an amount [N] satisfying 0<[N]≤0.01%,
        acid soluble aluminum (sol. Al) having an amount [sol. Al] satisfying 0.02%≤[sol. Al]≤0.06%,
        molybdenum (Mo) having an amount [Mo] satisfying 0<[Mo]≤0.2%,
        boron (B) having an amount [B] satisfying 0<[B]≤0.003%, and
        a balance of iron (Fe) and inevitable impurities,
    performing a finish hot rolling process on the reheated steel slab within a temperature range of Ar3+50° C. to 950° C. to form a hot-rolled steel sheet, and coiling the hot-rolled steel sheet within a temperature range of 450° C. to 700° C.;
    cold rolling the coiled steel sheet with a reduction ratio of 40% to 80%, and continuously annealing the cold-rolled steel sheet in a furnace while maintaining a partial pressure of hydrogen in the furnace as expressed by −4.0≤log(PH2O/PH2)≤−2.0, wherein in the continuous annealing, the cold-rolled steel sheet is first heated to a temperature of 560° C. to 680° C. at an average heating rate of 4° C./s or greater and is secondarily heated to a temperature of 760° C. to 850° C. at an average heating rate of 2° C./s or less;

first cooling the continuously annealed steel sheet to a temperature range of 630° C. to 670° C. at an average cooling rate of 2° C./s to 8° C./s and secondarily cooling the steel sheet to a temperature ranging from Ms+20° C. to Ms+50° C. at an average cooling rate of 3° C./s to 10° C./s; and performing a hot-dip galvanizing process on the secondarily cooled steel sheet within a temperature range of 440° C. to 480° C., and cooling the hot-dip galvanized steel sheet to a temperature of Ms−100° C. or lower at an average cooling rate of 4° C./s or greater, wherein Ms refers to a theoretical temperature at which martensite (M) is formed, and wherein the hot-dip galvanized steel sheet includes an exposed surface layer and a covered base steel sheet, and the base steel sheet has a microstructure comprising:

more than 90% by area of ferrite,

3% or less by area of bainite as described in Formula 1 below, and martensite as a remainder, and the base steel sheet has an a/b ratio of 0.7 or less, where (a) refers to a C+Mn content of a matrix of the base steel sheet in a surface region defined up to an average depth of 10 μm, and (b) refers to a C+Mn content of the matrix at a ¼ thickness position of the base steel sheet, $$\text{Bainite (\%)} = \{BA/(FA+MA+BA)\} \times 100 \quad \text{[Formula 1]}$$

where FA: ferrite area,
BA: bainite area, and
MA: martensite area.

7. The method of claim 6, wherein the base steel sheet of the hot-dip galvanized steel sheet has a c/d ratio of 0.8 or less, where (c) refers to a martensite area fraction of the matrix of the base steel sheet in the surface region defined up to an average depth of 10 μm, and (d) refers to a martensite area fraction of the matrix at the ¼ thickness position of the base steel sheet.

8. The method of claim 6, wherein the base steel sheet of the hot-dip galvanized steel sheet has an e/f ratio of 0.95 or less, where (e) refers to a C+Mn content of martensite in the surface region of the base steel sheet defined up to an average depth of 10 μm, and (f) refers to a C+Mn content of martensite at the ¼ thickness position of the base steel sheet.

9. The method of claim 6, wherein the base steel sheet of the hot-dip galvanized steel sheet has a g/h ratio of 1.2 or greater, where (g) refers to a ferrite grain size in the surface region of the base steel sheet defined up to an average depth of 10 μm, and (h) refers to a ferrite grain size at the ¼ thickness position of the base steel sheet.

10. The method of claim 6, wherein the partial pressure of hydrogen satisfies −3.0≤log(PH2O/PH2)≤−2.5.

11. The method of claim 6, further comprising performing an alloying heat treatment process after the hot-dip galvanizing process.

* * * * *